(12) United States Patent
Ebeid

(10) Patent No.: US 8,243,919 B2
(45) Date of Patent: Aug. 14, 2012

(54) METHOD AND APPARATUS FOR PERFORMING ELLIPTIC CURVE SCALAR MULTIPLICATION IN A MANNER THAT COUNTERS POWER ANALYSIS ATTACKS

(75) Inventor: Nevine Maurice Nassif Ebeid, Kitchener (CA)

(73) Assignee: Research In Motion Limited, Waterloo (CA)

( * ) Notice: Subject to any disclaimer, the term of this patent is extended or adjusted under 35 U.S.C. 154(b) by 1203 days.

(21) Appl. No.: 12/039,996

(22) Filed: Feb. 29, 2008

(65) Prior Publication Data

US 2008/0219437 A1 Sep. 11, 2008

Related U.S. Application Data

(60) Provisional application No. 60/893,498, filed on Mar. 7, 2007.

(51) Int. Cl.
*H04K 1/00* (2006.01)
(52) U.S. Cl. ............................ 380/30; 380/28
(58) Field of Classification Search ............... 380/28, 380/30
See application file for complete search history.

(56) References Cited

U.S. PATENT DOCUMENTS

| | | | |
|---|---|---|---|
| 6,738,478 B1 * | 5/2004 | Vanstone et al. | 380/28 |
| 6,795,553 B1 * | 9/2004 | Kobayashi et al. | 380/28 |
| 6,898,284 B2 | 5/2005 | Solinas | |
| 6,910,058 B2 | 6/2005 | Futa et al. | |
| 7,050,579 B1 * | 5/2006 | Koc et al. | 380/28 |
| 7,308,096 B2 * | 12/2007 | Okeya et al. | 380/28 |
| 7,505,587 B2 * | 3/2009 | Izu et al. | 380/30 |
| 8,014,521 B2 * | 9/2011 | Kitamura et al. | 380/30 |
| 2003/0206628 A1 * | 11/2003 | Gura et al. | 380/28 |
| 2005/0283514 A1 * | 12/2005 | McIvor et al. | 708/491 |
| 2009/0052657 A1 * | 2/2009 | Golic | 380/28 |
| 2010/0183142 A1 * | 7/2010 | Katagi et al. | 380/28 |

FOREIGN PATENT DOCUMENTS

WO 9935782 A1 7/1999

OTHER PUBLICATIONS

A Menezes, P Van Oorschot and S Vanstone, Chapter 14 Efficient Implementation, Handbook of Applied Cryptography, 1996, CRC Press, Waterloo, Ontario, Canada.
E Savas and CK Koc, The Montgomery Modular Inverse—Revisited, IEEE Transactions on Computers, vol. 49, No. 7, Jul. 2000, Oregon State University, Corvallis, OR, USA.

(Continued)

*Primary Examiner* — Peter Poltorak
*Assistant Examiner* — Amare F Tabor
(74) *Attorney, Agent, or Firm* — Ridout & Maybee LLP

(57) ABSTRACT

When multiplicative splitting is used to hide a scalar in an Elliptic Curve scalar Multiplication ECSM operation, the associated modular division operation employs the known Almost Montgomery Inversion algorithm. By including dummy operations in some of the branches of the main iteration loop of the Almost Montgomery Inversion algorithm, all branches of the algorithm may be viewed, from the perspective of a Power Analysis-based attack, as equivalent and, accordingly, devoid of information useful in determining the value of the scalar, which may be a cryptographic private key.

16 Claims, 8 Drawing Sheets

OTHER PUBLICATIONS

Richard Schroeppel, Hilarie Orman, Sean O'Malley, and Oliver Spatscheck, Fast Key Exchange with Elliptic Curve Systems, Department of Computer Science, University of Arizona, 1998, Springer-Verlag, Arizona, USA.

Yongyi Wu and Xiaoyang Zeng, A New Dual-Field Elliptic Curve Cryptography Processor, State Key Lab of ASIC & System, 2006, Fudan University, Shanghai, China.

EPO, Extended European Search Report, relating to application No. 08733550.1, dated Oct. 13, 2010.

Trichina E et al, Implementation of Elliptic Curve Cryptography with Built-In Counter Measures Against Side Channel Attacks, Cryptographic Hardware and Embedded Systems, InternationalWorkshop, Aug. 13, 2002.

Dalyy A et al, Fast Modular Inversion in the Montgomery Domain on Recon Gurable Logic, Internet Citation, Jul. 1, 2003, URL:http://eee.ucc.ie/staff/marnanel/Flies/papers/Daly_Marnane_Popovici_ISSC2003.pdf, retrieved on Dec. 13, 2006.

* cited by examiner

METHOD AND APPARATUS FOR PERFORMING ELLIPTIC CURVE SCALAR MULTIPLICATION IN A MANNER THAT COUNTERS POWER ANALYSIS ATTACKS

CROSS REFERENCE TO RELATED APPLICATIONS

The present application claims priority to U.S. Provisional Patent Application Ser. No. 60/893,498, filed Mar. 7, 2007, the contents of which are hereby incorporated herein by reference.

The present application is related to US Patent Application Publication No. 2008/0219438, which is being filed on even date herewith entitled "Method And Apparatus For Generating A Public Key In A Manner That Counters Power Analysis Attacks," the contents of which are hereby incorporated herein by reference.

The present application is related to US Patent Application Publication No. 2008/0219450, which is being filed on even date herewith entitled "Methods And Apparatus For Performing An Elliptic Curve Scalar Multiplication Operation Using Splitting," the contents of which are hereby incorporated herein by reference.

The present application is related to US Patent Application Publication No. 2008/0275932, which is being filed on even date herewith entitled "Integer Division In A Manner That Counters A Power Analysis Attack," the contents of which are hereby incorporated herein by reference.

The present application is related to US Patent Application Publication No. 2008/0301458, which is being filed on even date herewith entitled "DPA Countermeasure for the ECDSA," the contents of which are hereby incorporated herein by reference.

The present application is related to US Patent Application Publication No. 2008/0301459, which is being filed on even date herewith entitled "Power Analysis Countermeasure for the ECMQV Key Agreement Algorithm," the contents of which are hereby incorporated herein by reference.

The present application is related to US Patent Application Publication No. 2008/0273694, which is being filed on even date herewith entitled "Combining Interleaving with Fixed-Sequence Windowing in an Elliptic Curve Scalar Multiplication," the contents of which are hereby incorporated herein by reference.

FIELD OF THE INVENTION

The present application relates generally to cryptography and, more specifically, to obtaining a product of an Elliptic Curve Multiplication operation in a manner that counters power analysis attacks.

BACKGROUND OF THE INVENTION

Cryptography is the study of mathematical techniques that provide the base of secure communication in the presence of malicious adversaries. The main goals of secure communication include confidentiality of data, integrity of data and authentication of entities involved in a transaction. Historically, "symmetric key" cryptography was used to attempt to meet the goals of secure communication. However, symmetric key cryptography involves entities exchanging secret keys through a secret channel prior to communication. One weakness of symmetric key cryptography is the security of the secret channel. Public key cryptography provides a means of securing a communication between two entities without requiring the two entities to exchange secret keys through a secret channel prior to the communication. An example entity "A" selects a pair of keys: a private key that is only known to entity A and is kept secret; and a public key that is known to the public. If an example entity "B" would like to send a secure message to entity A, then entity B needs to obtain an authentic copy of entity A's public key. Entity B encrypts a message intended for entity A by using entity A's public key. Accordingly, only entity A can decrypt the message from entity B.

For secure communication, entity A selects the pair of keys such that it is computationally infeasible to compute the private key given knowledge of the public key. This condition is achieved by the difficulty (technically known as "hardness") of known mathematical problems such as the known integer factorization mathematical problem, on which is based the known RSA algorithm, which was publicly described in 1977 by Ron Rivest, Adi Shamir and Leonard Adleman.

Elliptic curve cryptography is an approach to public key cryptography based on the algebraic structure of elliptic curves over finite mathematical fields. An elliptic curve over a finite field, K, may be defined by a Weierstrass equation of the form $$y^2 + a_1 xy + a_3 y = x^3 + a_2 x^2 + a_4 x + a_6. \quad (1.1)$$

If $K = \mathbb{F}_p$, where p is greater than three and is a prime, equation (1.1) can be simplified to $$y^2 = x^3 + ax + b. \quad (1.2)$$

If $K = \mathbb{F}_{2^m}$, i.e., the elliptic curve is defined over a binary field, equation (1.1) can be simplified to $$y^2 + xy = x^3 + ax^2 + b. \quad (1.3)$$

The set of points on such a curve (i.e., all solutions of the equation together with a point at infinity) can be shown to form an abelian group (with the point at infinity as the identity element). If the coordinates x and y are chosen from a large finite field, the solutions form a finite abelian group.

Elliptic curves cryptosystems rely on the hardness of a problem called the Elliptic Curve Discrete Logarithm Problem (ECDLP). Where P is a point on an elliptic curve E and where the coordinates of P belong to a finite field, the scalar multiplication kP, where k is a secret integer, gives a point Q equivalent to adding the point P to itself k times. It is computationally infeasible, for large finite fields, to compute k knowing P and Q. The ECDLP is: find k given P and Q (=kP).

BRIEF DESCRIPTION OF THE DRAWINGS

Reference will now be made to the drawings, which show by way of example, embodiments of the invention, and in which.

DETAILED DESCRIPTION OF THE EMBODIMENTS

Figure 1:
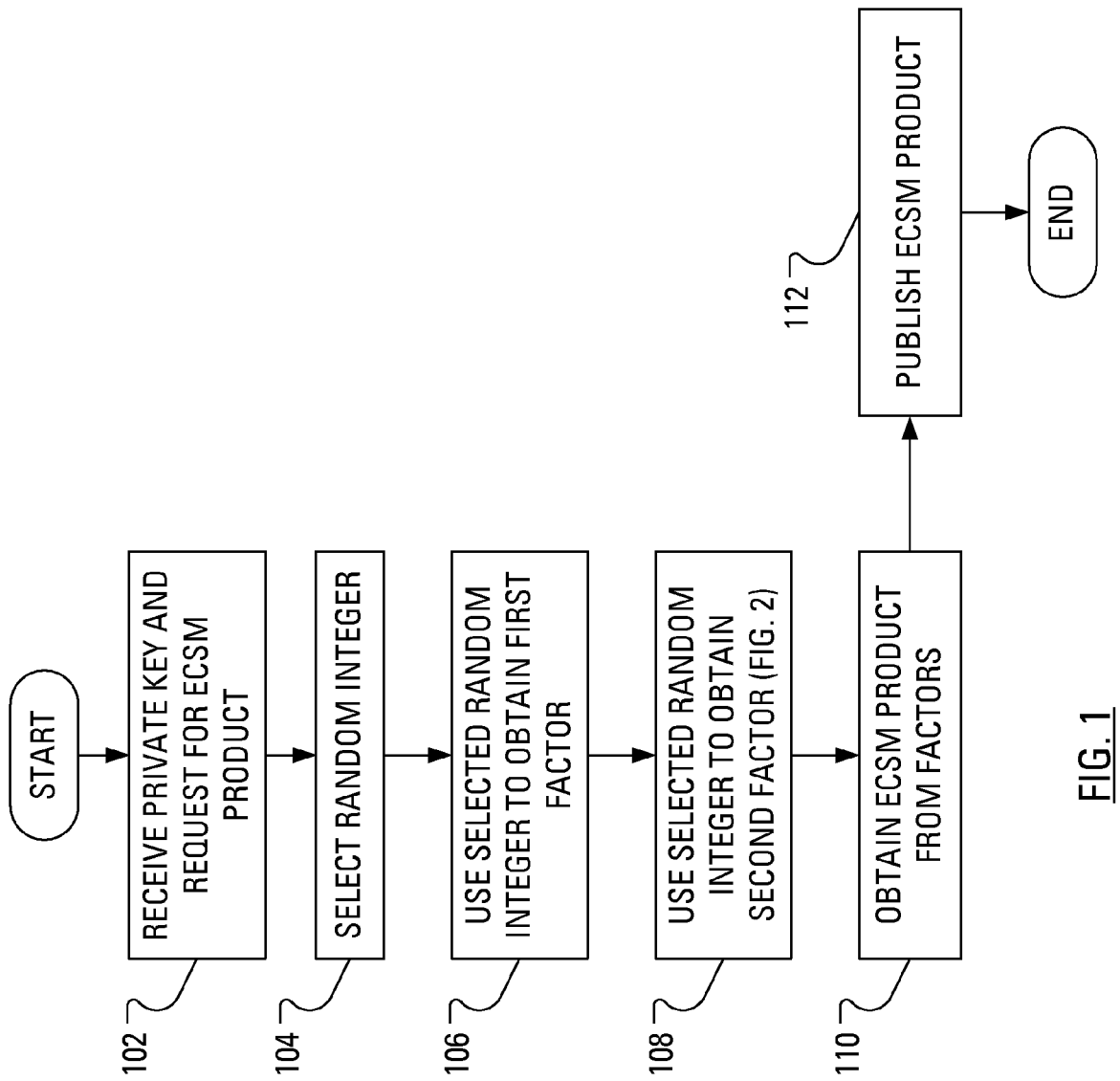
FIG. 1 illustrates steps of an example method of publishing a public key, the example method including determining two factors and a product of the two factors.

In operation, a device implementing an Elliptic Curve Cryptosystem selects a value for a secret key, k, which may be a long term secret key or a short term secret key. Additionally, the device has access to a "base point", P. The device then generates Q=kP and publishes Q as a public key. Q may then be used for encryption or may then be used in a key agreement protocol such as the known Elliptic Curve Diffie-Hellman (ECDH) key agreement protocol. In the known Elliptic Curve Menezes-Qu-Vanstone (ECMQV) key agreement protocol, Q=kP is not known as a public key as it is in the ECDH key agreement protocol. In the ECMQV key agreement protocol, and the known Elliptic Curve Digital Signature Algorithm (ECDSA), each entity has a (public key, private key) pair, say, for entity A, this pair is $(Q_A, d_A)$. This is long term pair, hence $Q_A = d_A P$ is computed once per key life. Notably, in another step of the ECMQV key agreement protocol and the ECDSA, there is a random integer k, selected by the signing entity in the ECDSA, or both entities separately in the ECMQV, that is multiplied by the base point P, i.e., kP is computed.

The general point of an attack on a cryptosystem is to determine the value of the private key. Recently, especially given the mathematical difficulty of solving the ECDLP, cryptosystem attacks have been developed that are based on careful measurements of the physical implementation of a cryptosystem, rather than theoretical weaknesses in the algorithms. This type of attack is called a "side channel attack". In one known example side channel attack, a measurement of the exact amount of time taken by known hardware to encrypt plain text has been used to simplify the search for a likely private key. Other examples of side channel attacks involve measuring such physical quantities as power consumption, electromagnetic leaks and sound. Many side channel attacks require considerable technical knowledge of the internal operation of the system on which the cryptography is implemented. In particular, a power analysis attack involves obtaining information useful to the determination of a private key either by observing properties of electricity in the power lines supplying hardware implementing the cryptosystem or by detecting electromagnetic emanations from the power lines or said hardware.

In a Simple Power Analysis (SPA) attack, an attacker monitors the power consumption of a device to visually identify large features of the generation of the public key Q through the scalar multiplication operation, kP. Indeed, monitoring of the power consumption during a scalar multiplication operation may enable an attacker to recognize exact instructions as the instructions are executed. For example, consider that the difference between the power consumption for the execution of a point doubling (D) operation and power consumption for the execution of a point addition (A) operation is obvious. Then, by investigating one power trace of a complete execution of a double-and-add algorithm employed to perform a scalar multiplication, the bits of the scalar private key k may be revealed. In particular, whenever a D operation is followed by an A operation, the corresponding bit $k_i=1$, otherwise if a D operation is followed by another D operation, then $k_i=0$. A sequence of doubling and addition point operations is referred to as a DA sequence.

In a Differential Power Analysis (DPA) side-channel attack, an attacker exploits the varying power consumed by a microprocessor while the microprocessor executes cryptographic program code. Using statistical analysis of the power consumption measurements of many runs of a given cryptographic algorithm, the attacker may infer information about a secret key used in the given cryptographic algorithm. A DPA attack on a scalar multiplication algorithm may be based on collecting hundreds of power consumption measurements obtained during the execution of the scalar multiplication with the same private key. Even if the execution is SPA-resistant, a statistical analysis on the measurements collected can still reveal the private key.

It would be desirable to determine a product of an ECSM operation in a manner that counters power analysis attacks.

Multiplicative splitting may be used to counter DPA attacks on an ECSM operation on a base point and a scalar. In particular, a random integer may be used to multiply the base point for one factor and divide the scalar for the other factor. However, the modular arithmetic involved in the determination of the other factor eventually employs the known Almost Montgomery Inversion algorithm. The main iteration loop of the Almost Montgomery Inversion algorithm includes multiple branches, not all of which include the same operations, which makes the main iteration loop susceptible to SPA attacks. By including dummy operations in some of the branches, all branches of the Almost Montgomery Inversion algorithm may be viewed, from the perspective of an SPA-based attack, as equivalent and, accordingly, devoid of information useful in determining the value of the scalar, which may be a cryptographic private key.

In accordance with an aspect of the present application there is provided a method of publishing a product of an elliptic curve scalar multiplication product of a scalar and a base point on an elliptic curve in a manner that counters power analysis attacks. The base point has a prime order. The method includes receiving the base point and the scalar, generating a random integer, wherein the random integer is invertible modulo the order, and obtaining a first factor by multiplying the random integer by the base point. The method also includes obtaining a second factor by dividing the scalar by the random integer using modular division, wherein a modulus used for the modular division is the order of the base point, the modular division involving a Montgomery Inversion and a Montgomery Multiplication, the Montgomery Inversion involving an Almost Montgomery Inversion, the Almost Montgomery Inversion having a main loop structure having a plurality of branches, each branch of the plurality of branches including a predetermined set of operations executed on a plurality of variables, obtaining a product by multiplying the first factor by the second factor using Montgomery Multiplication and publishing the product. In other aspects of the present application, a mobile communication device is provided for carrying out this method and a computer readable medium is provided for adapting a processor to carry out this method.

In accordance with an aspect of the present application there is provided a method of countering power analysis attacks. The method includes receiving a base point on an elliptic curve and a scalar, the base point having a prime order, generating a random integer, wherein the random integer is invertible modulo the order of the base point and obtaining a first factor by multiplying the random integer by the base point. The method further includes obtaining a second factor by dividing the scalar by the random integer using modular division, wherein a modulus used for the modular division is the order of the base point, the modular division involving a Montgomery Inversion and a Montgomery Multiplication, the Montgomery Inversion involving an Almost Montgomery Inversion, the Almost Montgomery Inversion having a main loop structure having a plurality of branches, each branch of the plurality of branches including a predetermined set of operations executed on a plurality of variables. The method further includes obtaining a product by multiplying the first factor by the second factor using Montgomery Multiplication.

Other aspects and features of the present invention will become apparent to those of ordinary skill in the art upon review of the following description of specific embodiments of the invention in conjunction with the accompanying figures.

Example steps in an expanded ECSM operation are presented in FIG. 1, as part of a larger Elliptic Curve cryptosystem application. The ECSM is called "expanded" due to the extra steps involved in splitting the scalar. A processor executing instructions describing the expanded ECSM operation receives (step 102) a private key and a request for an ECSM product, e.g., a request for $Q_A = d_A P$. In an example of key splitting, called "Multiplicative Splitting", the private key is split such that the expanded ECSM operation involves three operations: a first ECSM operation to determine a first factor; a modular division to determine a second factor; and a second ECSM operation to determine a product of the first factor and the second factor. In particular, r is a random integer invertible modulo u, where u is the prime order of P and r is selected from the range $[1, 2^m-1]$. The scalar multiplication $d_A P$ may then be evaluated as $$d_A P = \left[\frac{d_A}{r} \bmod u\right][rP]. \quad (1.4)$$

Responsive to receiving the request for an ECSM product, the processor selects (step 104, FIG. 1) a random integer, r from the range $[1, 2^m-1]$. The processor uses r (step 106) to obtain rP. That is, the processor performs a first ECSM operation to determine a first factor. The processor then uses r (step 108) to obtain $d_A/r$ mod u. That is, the processor performs a modular division to obtain a second factor. Once the factors have been determined in steps 106 and 108, the processor then obtains (step 110) the product of the factors to determine $d_A P$. Upon obtaining the product of the factors, the processor publishes (step 112) the product to the requesting application.

Modular inversion is used in different cryptographic protocols and underlying field operations. For example, point addition on a binary field consists of binary field operations and point addition on a prime field consists of prime field operations. While the following analysis is focused on prime fields, it is noted that the Almost Inverse algorithm, which is used in binary fields, could be modified in the same way in order to protect the value that is being inverted against SPA attacks, if needed. For more information on the Almost Inverse algorithm for binary fields, see Richard Schroeppel, Hilarie K. Orman, Sean W. O'Malley, Oliver Spatscheck, "Fast Key Exchange with Elliptic Curve Systems", Advances in Cryptology—CRYPTO 95, LNCS 963, p. 43-56.

The problem of performing a modular division to obtain $d_A/r$ mod u (step 108, FIG. 1), where u is an n-bit prime, has been well considered. A popular algorithm involves integers a and b, in this case representative of $d_A$ and r, respectively, where each of the integers a and b is represented by an array of w-bit digits. The length of each array is $$d = \lceil \frac{n}{w} \rceil$$

digits and the integer b is in the range $[1, 2^m-1]$, where $m=dw$.

Figure 2:
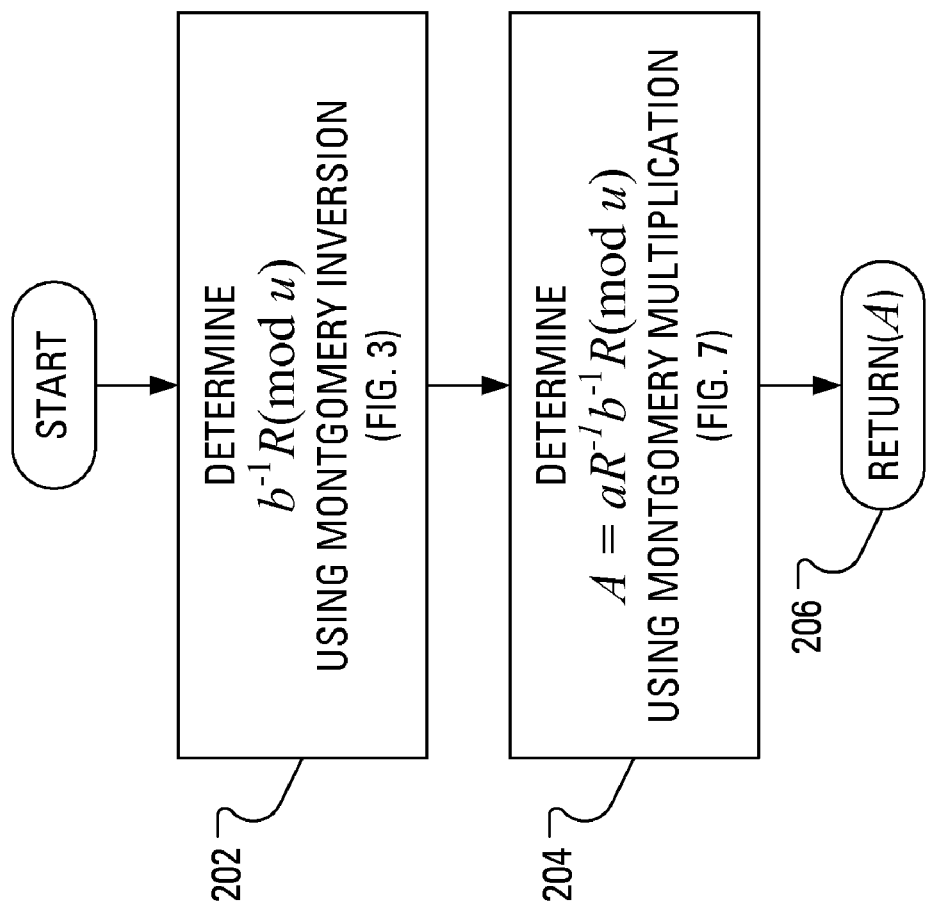
FIG. 2 illustrates steps of an example method of determining one of the factors of the product determined in the method of FIG. 1, the method involves a step employing Montgomery Inversion and a step employing Montgomery Multiplication.
Figure 7:
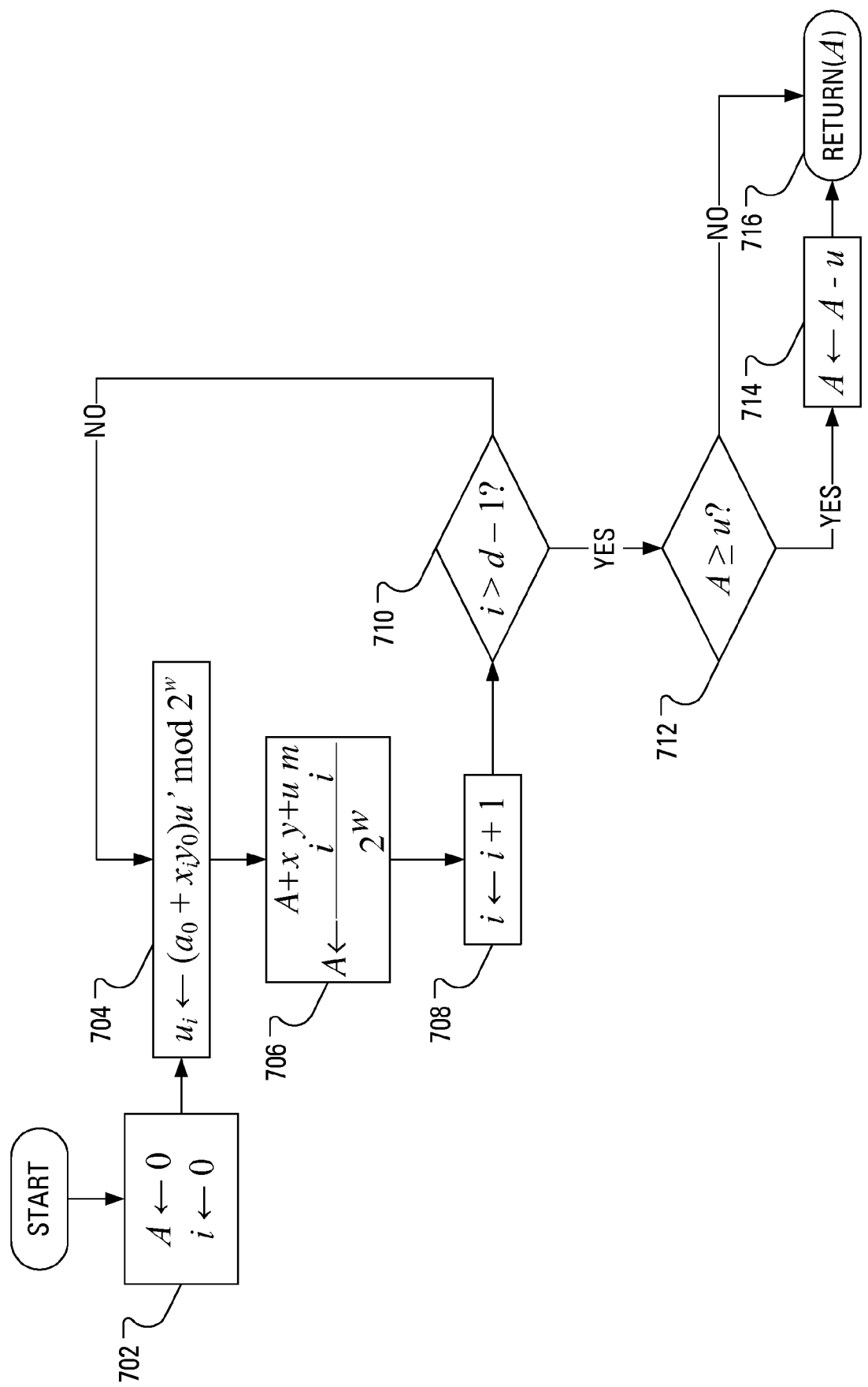
FIG. 7 illustrates steps of an example method of the Montgomery Multiplication employed in the method of FIG. 2.

Example steps in a method of determining $$A = \frac{a}{b}$$

mod u are presented in FIG. 2. The result, A, is represented by a d-element array of w-bit digits. Initially, the processor determines R/b mod u (step 202) using a technique known as "Montgomery Inversion", which is presented in FIG. 3, with $R=2^m$. Subsequently, the processor determines $$A = \frac{a}{R}\left(\frac{R}{b}\right)$$

mod u (step 204) using a technique known as "Montgomery Multiplication", example steps of which are presented in FIG. 7. The processor then returns A (step 206).

Figure 3:
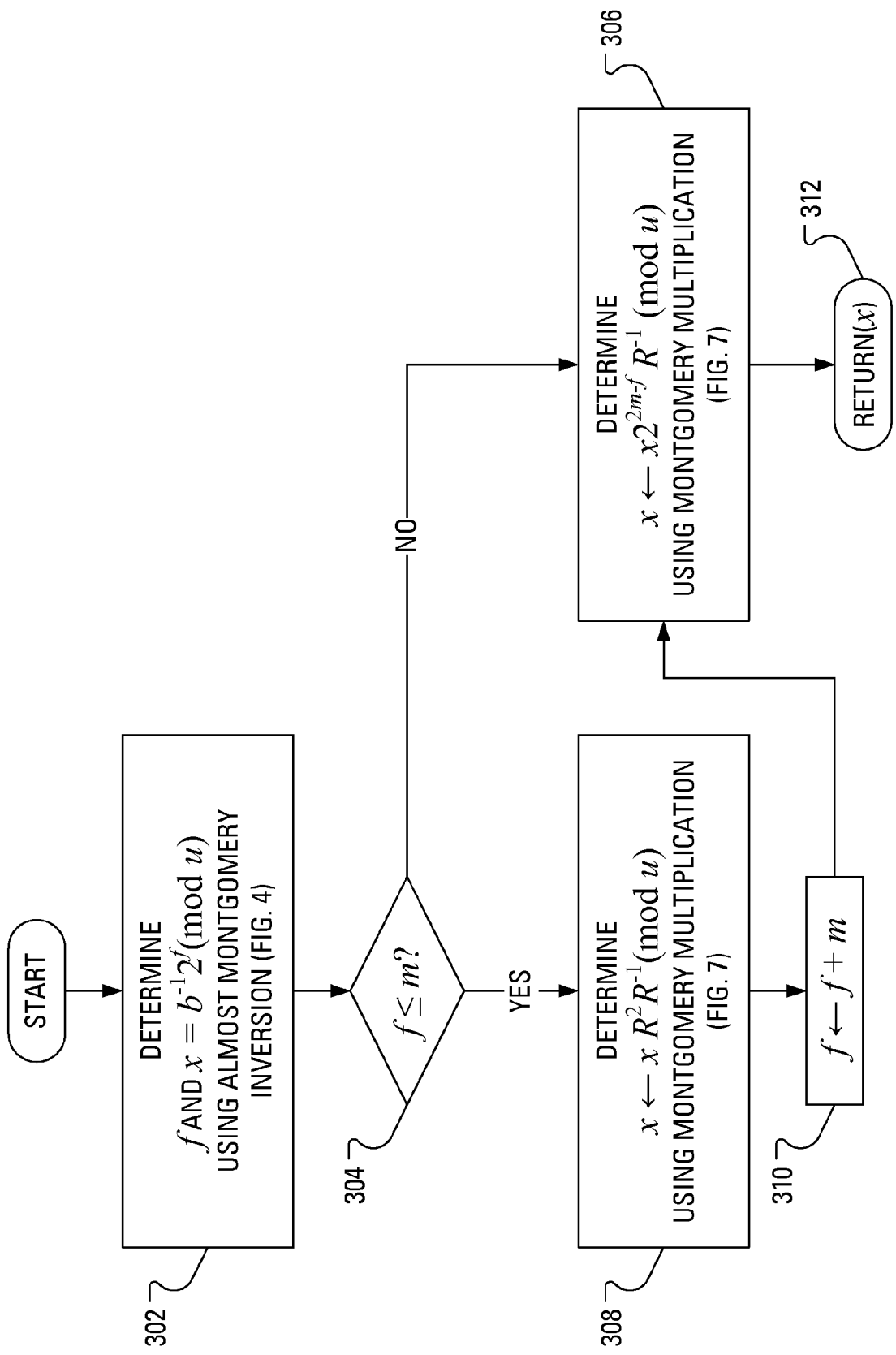
FIG. 3 illustrates steps of an example method of the Montgomery Inversion employed in the method of FIG. 2, the method employing Almost Montgomery Inversion.
Figure 4:
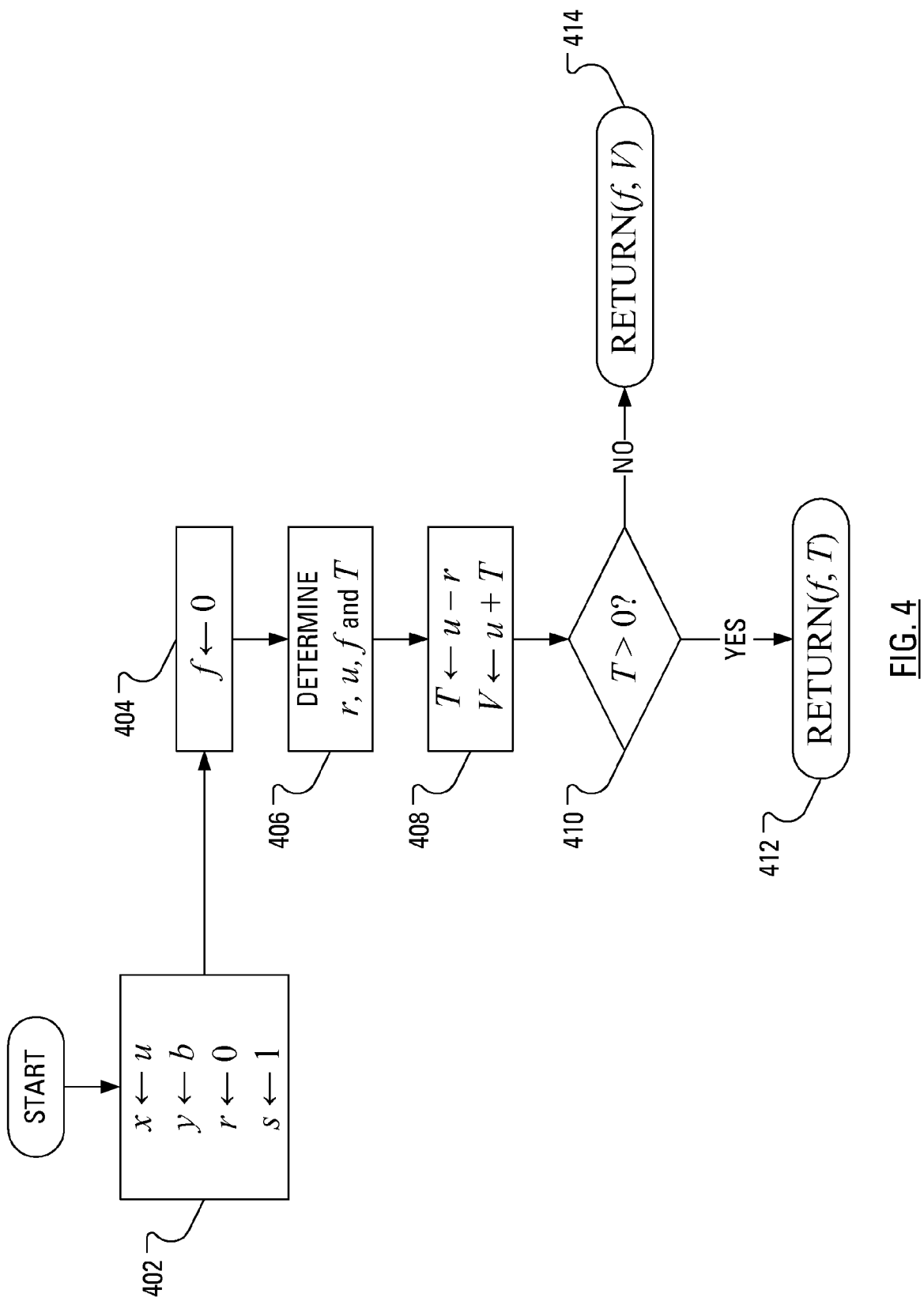
FIG. 4 illustrates steps of an example method of the Almost Montgomery Inversion employed in the method of FIG. 3, the method including a step representative of a looping operation.

Montgomery Inversion, as illustrated in FIG. 3, is designed to determine a d-element array of w-bit digits having the value R/b mod u given u, m ($R=2^m$) and b (i.e., the random integer r selected in step 104 in FIG. 1). The inversion begins with the processor determining $$x = \frac{2^f}{b}$$

mod u (step 302) and the corresponding f where $n \leq f \leq m+n$. The determination of step 302 may be accomplished with the "Almost Montgomery Inversion", example steps of which are illustrated in FIG. 4. The processor then compares f to m (step 304). If the processor determines that f is greater than m, the processor uses Montgomery Multiplication (step 306) to update the output variable x. In particular, the processor determines $$x \frac{2^{2m-f}}{R}$$

mod u and assigns the product to the output variable x. Simplifying, $$x\frac{2^{2m-f}}{R} \bmod u = \frac{2^f}{b} \frac{2^{2m-f}}{2^m} \bmod u \quad (1.5)$$
$$= \frac{2^m}{b} \bmod u$$
$$= \frac{R}{b} \bmod u.$$

The processor then returns $$x = \frac{R}{b}$$

mod u (step 312) to the calling method.

If the processor determines that f is less than or equal to m, the processor uses (step 308) Montgomery Multiplication to update the output variable x. In particular, the processor determines $$\frac{x}{R}R^2$$

mod u and assigns the product to the output variable x. Simplifying, $$\frac{x}{R}R^2 \bmod u = \frac{2^f}{bR}R^2 \bmod u \qquad (1.6)$$
$$= \frac{2^f R}{b} \bmod u$$
$$= \frac{2^{f+m}}{b} \bmod u.$$

The processor then increases (step 310) the value of the variable f by m, i.e., f←f+m. Accordingly, the result of step 308 may be expressed as $$x = \frac{2^f}{b}$$

mod u. The processor then uses (step 306) Montgomery Multiplication to update the output variable x. In particular, the processor determines $$x\frac{2^{2m-f}}{R}$$

mod u and assigns the product to the output variable x. Simplifying, $$x\frac{2^{2m-f}}{R} \bmod u = \frac{2^f}{b}\frac{2^{2m-f}}{2^m} \bmod u \qquad (1.7)$$
$$= \frac{2^m}{b} \bmod u$$
$$= \frac{R}{b} \bmod u.$$

The processor then returns $$x = \frac{R}{b}$$

mod u (step 312) to the calling method.

While the preceding makes clear the Montgomery Inversion by which the processor determines R/b mod u (step 202, FIG. 2), recall that the determination of step 302 may rely on the Almost Montgomery Inversion, example steps of which are illustrated in FIG. 4.

The Almost Montgomery Inversion of FIG. 4 takes, as input, the n-bit prime U and the integer b, represented as a d-element array of w-bit digits. The integer b is in the range $[1, 2^m-1]$, where m=dw. The output of the Almost Montgomery Inversion is $2^f/b$ mod u and f, where n≤f≤m+n.

In the initial step of the Almost Montgomery Inversion, the processor assigns values (step 402) to temporary variables x, y, r and s. Subsequently, the processor initializes (step 404) the variable f to zero. The processor uses the values of the temporary variables x and y to determine (step 406) values for further temporary variables r, u, f and T. The value of the temporary variable U is then used (step 408) by the processor in combination with values of temporary variables r and T to update the values of temporary variables T (T←u−r) and V (V←u+T). The value returned by the Almost Montgomery Inversion is based on the processor determining (step 408) whether the temporary variable T is greater than zero. If the temporary variable T is determined to be greater than zero, the processor returns f and T (step 412). If the temporary variable T is determined to be less than or equal to zero, the Almost Montgomery Inversion returns f and V (step 414).

Figure 5:
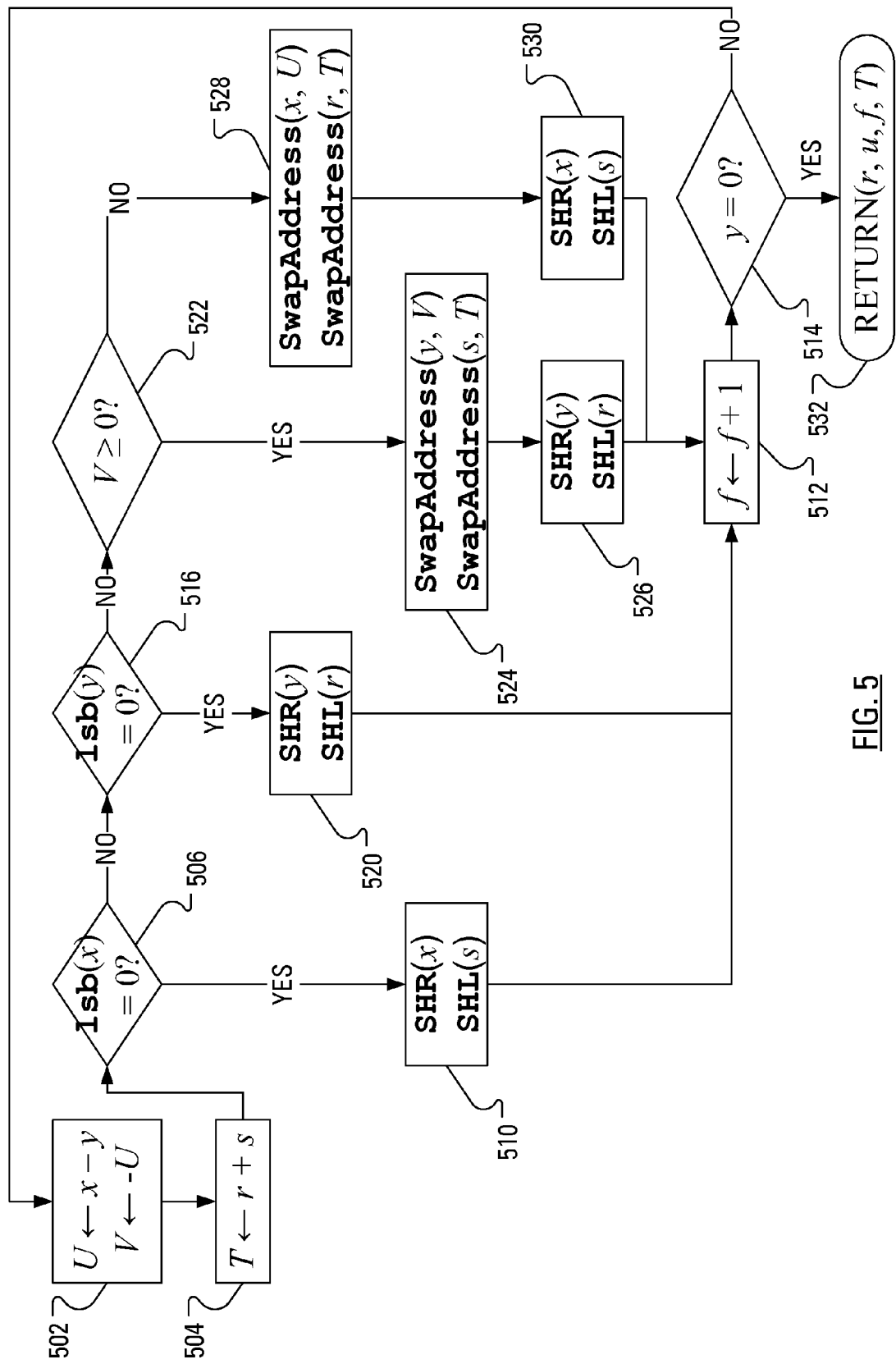
FIG. 5 illustrates steps of a conventional method of executing the looping operation represented in the method of FIG. 4.

Conventional steps in the determination (step 406), by the processor, of values for further temporary variables r, u, f and T based on the values of the modulus u and the random number r are illustrated in FIG. 5.

The determination begins with the processor assigning (step 502), to U, the difference between x and y and, to V, the negation of U. The processor then assigns (step 504), to T, the sum of r and s. A determination (step 506) is then made by the processor as to whether the least significant bit of x is zero, i.e., it is determined whether x is even or odd. If the processor determines that x is even, then the processor shifts (step 510) the bits in x right, i.e., the value of x is halved. Additionally, if the processor determines that x is even, then the processor shifts (step 510) the bits in s left, i.e., the value of s is doubled.

Subsequent to the doubling of s and the halving of x, the processor increments f (step 512) by one and determines (step 514) whether y has reached zero. If the processor determines that y has reached zero, the determination represented by FIG. 5 returns r, u, f and T (step 532) to the method represented by FIG. 4. If the processor determines that y has remained positive, new values are assigned (steps 502 and 504), by the processor, to the temporary variables T (←r+s), U (←x−y) and V (←−U) and the testing of x (step 506), perhaps y (step 516) and maybe V (step 522) is repeated.

If the processor determines that x is odd, then a determination (step 516) is then made by the processor as to whether the least significant bit of y is zero, i.e., it is determined whether y is even or odd. If the processor determines that y is even, then the processor shifts (step 520) the bits in y right, i.e., the value of y is halved. Additionally, if the processor determines that y is even, then the processor shifts (step 520) the bits in r left, i.e., the value of r is doubled.

Subsequent to the doubling of r and the halving of y, the processor increments f (step 512) by one and determines (step 514) whether y has reached zero. If the processor determines that y has reached zero, the determination represented by FIG. 5 returns r, u, f and T (step 532) to the method represented by FIG. 4. If the processor determines that y has remained positive, new values are assigned (steps 502 and 504), by the processor, to the temporary variables T (←r+s), U (←x−y) and V (←−U) and the testing of x (step 506), perhaps y (step 516) and maybe V (step 522) is repeated.

If the processor determines that y is odd, then a determination (step 522) is then made by the processor as to whether $V \geq 0$. If the processor determines that $V \geq 0$, then the processor swaps (step 524) the addresses to which the variables y and V refer. That is, y is assigned the value associated with V and vice versa. Additionally, the processor swaps (step 524) the addresses to which the variables s and T refer. That is, s is assigned the value associated with T and vice versa. The processor then shifts (step 526) the bits in y right, i.e., the value of y is halved. Additionally, the processor shifts (step 526) the bits in r left, i.e., the value of r is doubled. As a result of the execution of steps 524 and 526, $$y \leftarrow \frac{y-x}{2},$$

$s \leftarrow s+r$ and $r \leftarrow 2r$.

Subsequent to the doubling of r and the halving of y, the processor increments f (step 512) by one and determines (step 514) whether y has reached zero. If the processor determines that y has reached zero, the determination represented by FIG. 5 returns r, u, f and T (step 532) to the method represented by FIG. 4. If the processor determines that y has remained positive, new values are assigned (steps 502 and 504), by the processor, to the temporary variables T ($\leftarrow$r+s), U ($\leftarrow$x−y) and V ($\leftarrow$−U) and the testing of x (step 506), perhaps y (step 516) and maybe V (step 522) is repeated.

If the processor determines (step 522) that V<0, then the processor swaps (step 528) the addresses to which the variables x and U refer. That is, x is assigned the value associated with U and vice versa. Additionally, the processor swaps (step 528) the addresses to which the variables r and T refer. That is, r is assigned the value associated with T and vice versa. The processor then shifts (step 530) the bits in x right, i.e., the value of x is halved. Additionally, the processor shifts (step 530) the bits in s left, i.e., the value of s is doubled. As a result of the execution of steps 528 and 530, $$x \leftarrow \frac{x-y}{2},$$

$r \leftarrow r+s$ and $s \leftarrow 2s$.

Subsequent to the doubling of s and the halving of x, the processor increments f (step 512) by one and determines (step 514) whether y has reached zero. If the processor determines that y has reached zero, the determination represented by FIG. 5 returns r, u, f and T (step 532) to the method represented by FIG. 4. If the processor determines that y has remained positive, new values are assigned (steps 502 and 504), by the processor, to the temporary variables T (T$\leftarrow$r+s), U (U$\leftarrow$x−y) and V (V$\leftarrow$−U) and the testing of x (step 506), perhaps y (step 516) and maybe V (step 522) is repeated.

Returning to FIG. 3, steps 306 and 308 require Montgomery Multiplication, example steps of which are illustrated in FIG. 7. It is worth noting for the following that the value $R^2$ mod u, where $R=2^m$, and the value $u'=u^{-1}$ mod $2^w$ are determined once per modulus, per curve. Montgomery Multiplication, as illustrated in FIG. 7, is designed to determine $$\frac{xy}{2^m} \bmod u,$$

where x and y are d-digit arrays in base $2^w$, i.e., $x=(x_{d-1}, \ldots, x_0)_{2^w}$ and $y=(y_{d-1}, \ldots, y_0)_{2^w}$, and m=dw. The inversion begins with the processor initializing (step 702) a variable $A=(a_d, a_{d-1}, \ldots, a_0)_{2^w}$ to zero, where A is a (d+1)-digit array of w-bit digits in base $2^w$. The processor also initializes (step 702) a counter, i, to zero.

In step 704, a product of the $i^{th}$ element of the x array and the $0^{th}$ element of the y array is added, by the processor, to the $0^{th}$ element of the a array and the processor multiplies the summand by the modular inverse of u. The resultant product is assigned to the $i^{th}$ element of a u array.

In step 706, a product of m and the $i^{th}$ element of the u array is determined by the processor and added to a sum formed by adding, to the variable A, the product of the $i^{th}$ element of the x array and the y integer. This sum is divided, by the processor, by $2^w$ and the quotient is assigned to the variable A.

The processor then increments (step 708) the counter and determines (step 710) whether the counter exceeds (d−1). If the counter remains less than (d−1), the determination of the sum of step 704 and the quotient of step 706 are repeated.

If the processor determines (step 710) that the counter has exceeded (d−1), the processor determines (step 712) whether the variable A is greater than or equal to the variable u. If the processor determines (step 712) that the variable A is greater than or equal to the variable u, then the processor reduces (step 714) the variable A by U. Subsequent to reducing the variable A by U, or if the processor determines that the variable A is less than the variable u, the processor returns (step 716) the value of the variable A, i.e., the product of the Montgomery Multiplication, to the calling method.

Conventional steps in the determination (step 406), by the processor, of values for further temporary variables r, u, f and T based on the values of the modulus u and the random number r are illustrated in FIG. 5.

Based on the uneven quantity of steps in the four branches (see FIG. 5) of the determination (step 406), by the processor, of values for temporary variables r, u, f and T given the values of the temporary variables x and y, the Almost Montgomery Inverse algorithm, represented by FIG. 4, may be considered vulnerable to an SPA attack.

Figure 6:
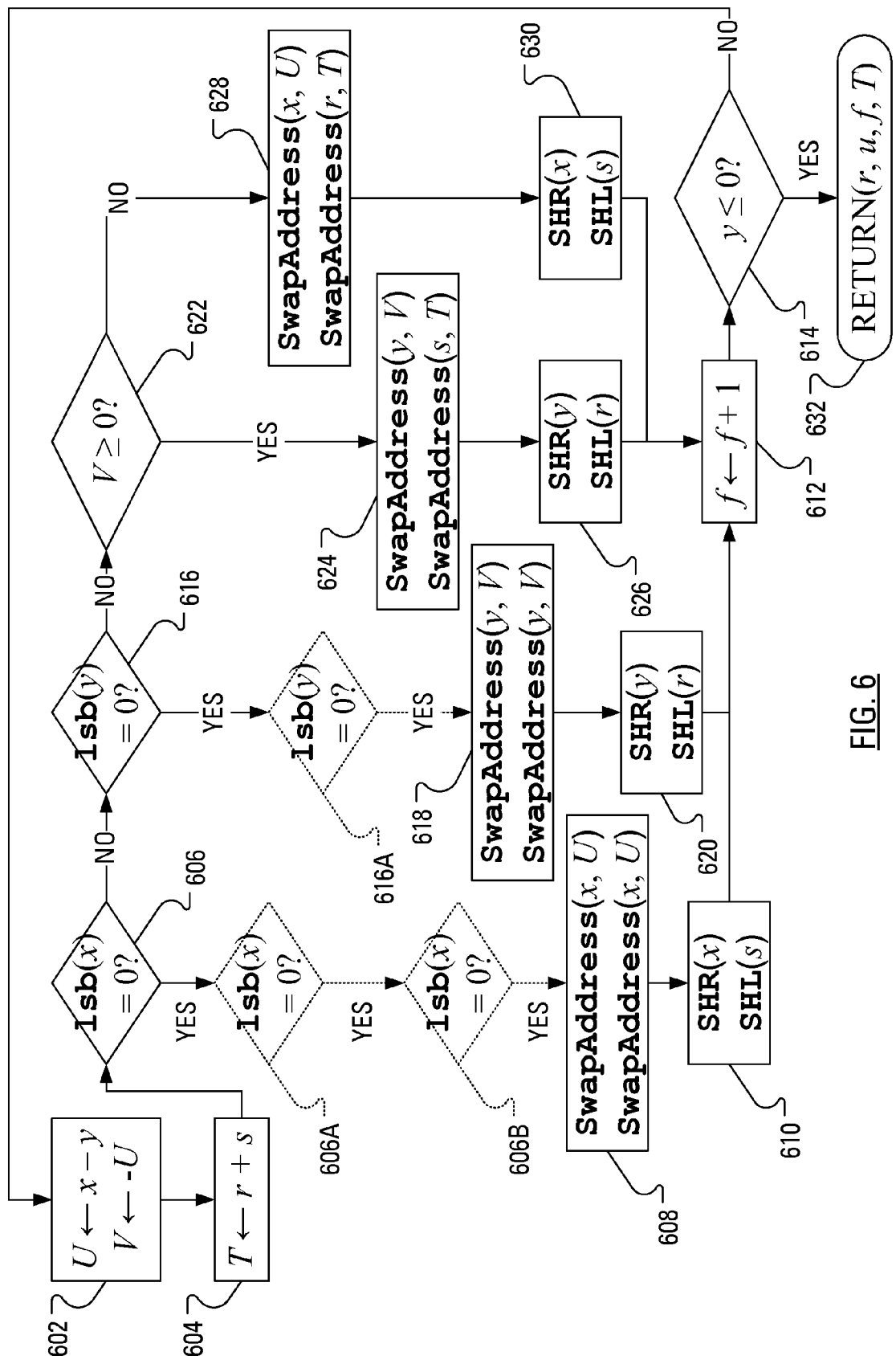
FIG. 6 illustrates steps of a method of executing the looping operation represented in the method of FIG. 4 according to an embodiment.

Novel steps in the determination (step 406), by the processor, of values for further temporary variables r, u, f and T based on the values of the modulus u and the random number r are illustrated in FIG. 6.

In overview, dummy swapping steps are added to the two of the four branches that, in the method represented in FIG. 5, did not include swapping steps. Accordingly, each branch appears, to a power analysis attack, indistinguishable from the other branches. In this manner, the Almost Inverse Montgomery is provided with a countermeasure to SPA attacks.

The determination begins with the processor assigning (step 602), to U, the difference between x and y and the negation of U to V. The processor then assigns (step 604), to T, the sum of r and s. A determination (step 606) is then made by the processor as to whether the least significant bit of x is zero, i.e., it is determined whether x is even or odd. If the processor determines that x is even, the processor swaps (step 608) the addresses to which the variables x and U refer. That is, x is assigned the value associated with U and vice versa. The processor then swaps (step 608) the addresses to which the variables x and U refer for a second time returning the addresses to which the variables refer to their respective states before the execution of step 608. The processor then shifts (step 610) the bits in x right, i.e., the value of x is halved. Additionally when the processor determines that x is even, the processor shifts (step 610) the bits in s left, i.e., the value of s is doubled.

Subsequent to the doubling of s and the halving of x, the processor increments f (step 612) by one and determines (step 614) whether y has reached zero. If the processor determines that y has reached zero, the determination represented by FIG. 6 returns r, u, f and T (step 632) to the method represented by FIG. 4. If the processor determines that y has remained positive, new values are assigned (steps 602 and 604), by the processor, to the temporary variables T (←r+s), U (←x−y) and V (←−U) and the testing of x (step 606) is repeated.

If the processor determines (step 606) that x is odd, then a determination (step 616) is made by the processor as to whether the least significant bit of y is zero, i.e., it is determined whether y is even or odd. If the processor determines that y is even, the processor swaps (step 618) the addresses to which the variables y and V refer. That is, y is assigned the value associated with V and vice versa. The processor then swaps (step 618) the addresses to which the variables y and V refer for a second time returning the addresses to which the variables refer to their respective states before the execution of step 618. The processor then shifts (step 620) the bits in y right, i.e., the value of y is halved. Additionally when the processor determines that y is even, the processor shifts (step 620) the bits in r left, i.e., the value of r is doubled.

Subsequent to the doubling of r and the halving of y, the processor increments f (step 612) by one and determines (step 614) whether y has reached zero. If the processor determines that y has reached zero, the determination represented by FIG. 6 returns r, u, f and T (step 632) to the method represented by FIG. 4. If the processor determines that y has remained positive, new values are assigned (steps 602 and 604), by the processor, to the temporary variables T (←r+s), U (←x−y) and V (←−U) and the testing of x (step 606) is repeated.

If the processor determines (step 616) that y is odd, then a determination (step 622) is made by the processor as to whether V≧0. If the processor determines that V≧0, then the processor swaps (step 624) the addresses to which the variables y and V refer. That is, y is assigned the value associated with V and vice versa. Additionally, the processor swaps (step 624) the addresses to which the variables s and T refer. That is, s is assigned the value associated with T and vice versa. The processor then shifts (step 626) the bits in y right, i.e., the value of y is halved. Additionally, the processor shifts (step 626) the bits in r left, i.e., the value of r is doubled. As a result of the execution of steps 624 and 626, $$y \leftarrow \frac{y-x}{2},$$

s←s+r and r←2r.

Subsequent to the doubling of r and the halving of y, the processor increments f (step 612) by one and determines (step 614) whether y has reached zero. If the processor determines that y has reached zero, the determination represented by FIG. 6 returns r, u, f and T (step 632) to the method represented by FIG. 4. If the processor determines that y has remained positive, new values are assigned (steps 602 and 604), by the processor, to the temporary variables T (T←r+s), U (U←x−y) and V (V←−U) and the testing of x (step 606), perhaps y (step 616) and maybe V (step 622) is repeated.

If the processor determines (step 622) that V<0, then the processor swaps (step 628) the addresses to which the variables x and U refer. That is, x is assigned the value associated with U and vice versa. Additionally, the processor swaps (step 628) the addresses to which the variables r and T refer. That is, r is assigned the value associated with T and vice versa. The processor then shifts (step 630) the bits in x right, i.e., the value of x is halved. Additionally, the processor shifts (step 630) the bits in s left, i.e., the value of s is doubled. As a result of the execution of steps 628 and 630, $$x \leftarrow \frac{x-y}{2},$$

r←r+s and s←2s.

Subsequent to the doubling of s and the halving of x, the processor increments f (step 612) by one and determines (step 614) whether y has reached zero. If the processor determines that y has reached zero, the determination represented by FIG. 6 returns r, u, f and T (step 632) to the method represented by FIG. 4. If the processor determines that y has remained positive, new values are assigned (steps 602 and 604), by the processor, to the temporary variables T (T←r+s), U (U←x−y) and V (V←−U) and the testing of x (step 606) is repeated.

In review, the portion of the Almost Montgomery Inversion represented by FIG. 5 has four branches: a first branch with step 510 (two shift operations); a second branch with step 520 (two shift operations); a third branch with steps 524 (two swap operations) and 526 (two shift operations); and a fourth branch with steps 528 (two swap operations) and 530 (two shift operations). By monitoring power consumption, an SPA attacker may determine, for a given iteration, whether one of the modulus u or the random number r is even (first branch or second branch executed) or both of the modulus u or the random number r are odd (third branch or fourth branch executed).

In contrast, the portion of the Almost Montgomery Inversion represented by FIG. 6 has four branches: a first branch with steps 608 (two "dummy" swap operations) and 610 (two shift operations); a second branch with steps 618 (two "dummy" swap operations) and 620 (two shift operations); a third branch with steps 624 (two swap operations) and 626 (two shift operations); and a fourth branch with steps 628 (two swap operations) and 630 (two shift operations). By monitoring power consumption, an SPA attacker records the same, or similar, power consumption for execution of all four branches. Conveniently, the SPA attacker learns nothing about the modulus u or the random number r.

Note that when x is even, only one conditional determination (step 606) is made, while, when x is odd and y is even, two conditional determinations (step 606, step 616) are made and when x and y are odd, three conditional determinations (step 606, step 616, step 622) are made. Optionally, additional conditional determinations may be added to the first branch and the second branch. In the first branch, two conditional determinations (step 606A and step 606B) may be inserted so that even though x is even, three conditional determinations (step 606, step 606A, step 606B) are made. Similarly, in the second one conditional determination (step 616A) may be inserted so that even though x is odd and y is even, three conditional determinations (step 606, step 616, step 616A) are made. A compiler or interpreter of software code used to implement the method of FIG. 6 should ensure that the number of check and jump instructions is equal to the number of times the condition is repeated in the high-level language.

Figure 8:
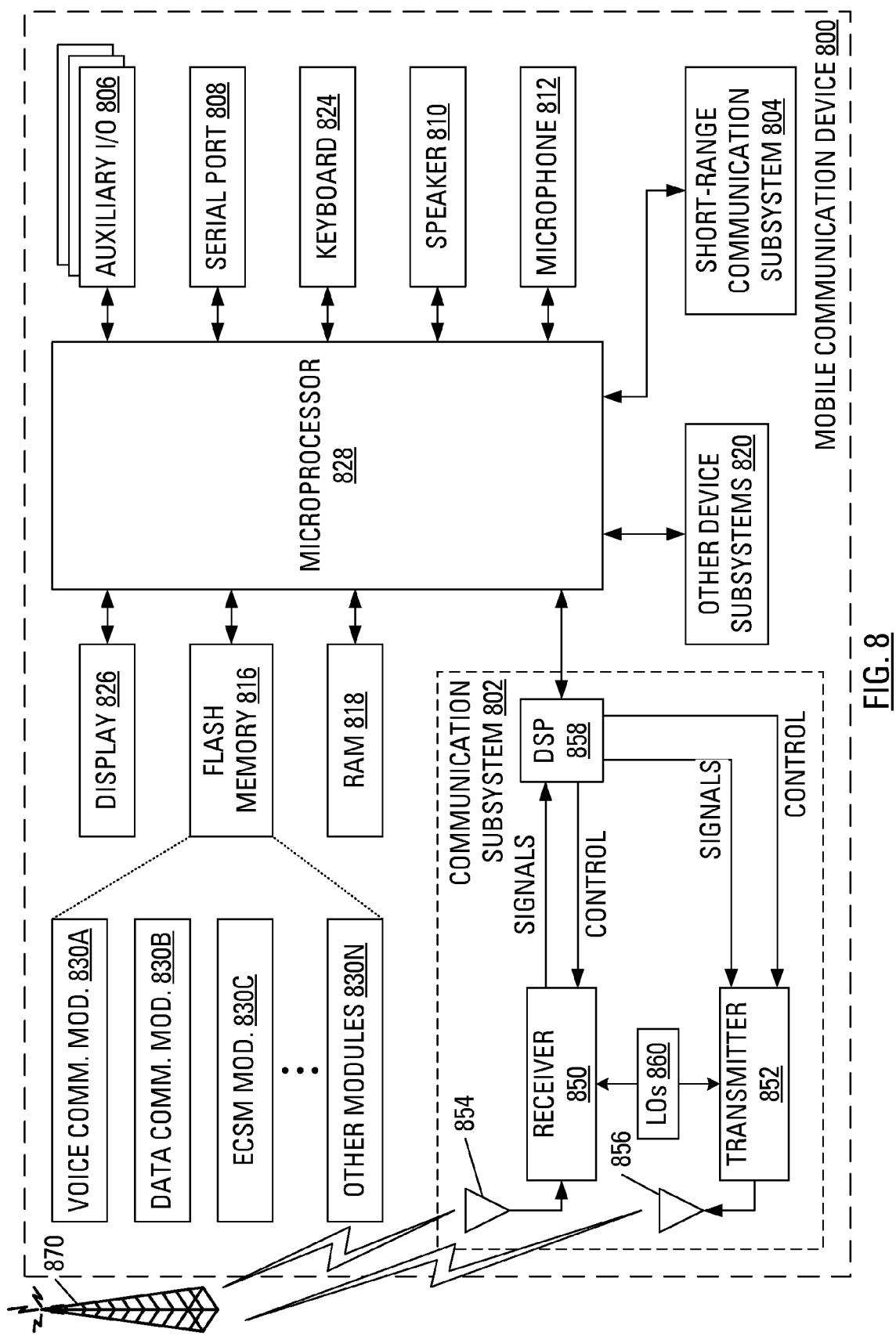
FIG. 8 illustrates an apparatus for carrying out the method of FIG. 1 including the looping operation of FIG. 6.

FIG. 8 illustrates a mobile communication device 800 as an example of a device that may carry out the method of FIG. 1 including the execution of the steps of the method of FIG. 6.

The mobile communication device 800 includes a housing, an input device (e.g., a keyboard 824 having a plurality of keys) and an output device (e.g., a display 826), which may be a full graphic, or full color, Liquid Crystal Display (LCD). In some embodiments, the display 426 may comprise a touchscreen display. In such embodiments, the keyboard 424 may comprise a virtual keyboard. Other types of output devices may alternatively be utilized. A processing device (a microprocessor 828) is shown schematically in FIG. 8 as coupled between the keyboard 824 and the display 826. The microprocessor 828 controls the operation of the display 826, as well as the overall operation of the mobile communication device 800, in part, responsive to actuation of the keys on the keyboard 824 by a user.

The housing may be elongated vertically, or may take on other sizes and shapes (including clamshell housing structures). Where the keyboard 824 includes keys that are associated with at least one alphabetic character and at least one numeric character, the keyboard 824 may include a mode selection key, or other hardware or software, for switching between alphabetic entry and numeric entry.

In addition to the microprocessor 828, other parts of the mobile communication device 800 are shown schematically in FIG. 8. These may include a communications subsystem 802, a short-range communications subsystem 804, the keyboard 824 and the display 826. The mobile communication device 800 may further include other input/output devices such as a set of auxiliary I/O devices 806, a serial port 808, a speaker 810 and a microphone 812. The mobile communication device 800 may also include memory devices, such as a flash memory 816 and a Random Access Memory (RAM) 818, and various other device subsystems 820. The mobile communication device 800 may comprise a two-way radio frequency (RF) communication device having voice and data communication capabilities. In addition, the mobile communication device 800 may have the capability to communicate with other computer systems via the Internet.

Operating system software executed by the microprocessor 828 may be stored in a computer readable medium, such as the flash memory 816, but may be stored in other types of memory devices, such as a read only memory (ROM) or similar storage element. In addition, system software, specific device applications, or parts thereof, may be temporarily loaded into a volatile store, such as the RAM 818. Communication signals received by the mobile device may also be stored to the RAM 818.

The microprocessor 828, in addition to its operating system functions, enables execution of software applications on the mobile communication device 800. A predetermined set of software applications that control basic device operations, such as a voice communications module 830A and a data communications module 830B, may be installed on the mobile communication device 800 during manufacture. A ECSM module 830C may also be installed on the mobile communication device 800 during manufacture, to implement aspects of the present disclosure. As well, additional software modules, illustrated as an other software module 830N, which may be, for instance, a PIM application, may be installed during manufacture. The PIM application may be capable of organizing and managing data items, such as e-mail messages, calendar events, voice mail messages, appointments and task items. The PIM application may also be capable of sending and receiving data items via a wireless carrier network 470 represented by a radio tower. The data items managed by the PIM application may be seamlessly integrated, synchronized and updated via the wireless carrier network 870 with the device user's corresponding data items stored or associated with a host computer system.

Communication functions, including data and voice communications, are performed through the communication subsystem 802 and, possibly, through the short-range communications subsystem 804. The communication subsystem 802 includes a receiver 850, a transmitter 852 and one or more antennas, illustrated as a receive antenna 854 and a transmit antenna 856. In addition, the communication subsystem 802 also includes a processing module, such as a digital signal processor (DSP) 858, and local oscillators (LOs) 860. The specific design and implementation of the communication subsystem 802 is dependent upon the communication network in which the mobile communication device 800 is intended to operate. For example, the communication subsystem 802 of the mobile communication device 800 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), etc. Other types of data and voice networks, both separate and integrated, may also be utilized with the mobile communication device 800.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the mobile communication device 800 may send and receive communication signals over the wireless carrier network 870. Signals received from the wireless carrier network 870 by the receive antenna 854 are routed to the receiver 850, which provides for signal amplification, frequency down conversion, filtering, channel selection, etc., and may also provide analog to digital conversion. Analog-to-digital conversion of the received signal allows the DSP 858 to perform more complex communication functions, such as demodulation and decoding. In a similar manner, signals to be transmitted to the wireless carrier network 870 are processed (e.g., modulated and encoded) by the DSP 858 and are then provided to the transmitter 852 for digital to analog conversion, frequency up conversion, filtering, amplification and transmission to the wireless carrier network 870 (or networks) via the transmit antenna 856.

In addition to processing communication signals, the DSP 858 provides for control of the receiver 850 and the transmitter 852. For example, gains applied to communication signals in the receiver 850 and the transmitter 852 may be adaptively controlled through automatic gain control algorithms implemented in the DSP 858.

In a data communication mode, a received signal, such as a text message or web page download, is processed by the communication subsystem 802 and is input to the microprocessor 828. The received signal is then further processed by the microprocessor 828 for output to the display 826, or alternatively to some auxiliary I/O devices 806. A device user may also compose data items, such as e-mail messages, using the keyboard 824 and/or some other auxiliary I/O device 806, such as a touchpad, a rocker switch, a thumb-wheel, a trackball, a touchscreen, or some other type of input device. The composed data items may then be transmitted over the wireless carrier network 870 via the communication subsystem 802.

In a voice communication mode, overall operation of the device is substantially similar to the data communication mode, except that received signals are output to a speaker 810, and signals for transmission are generated by a microphone 812. Alternative voice or audio I/O subsystems, such as a voice message recording subsystem, may also be implemented on the mobile communication device 800. In addition, the display 826 may also be utilized in voice communication mode, for example, to display the identity of a calling party, the duration of a voice call, or other voice call related information.

The short-range communications subsystem 804 enables communication between the mobile communication device 800 and other proximate systems or devices, which need not necessarily be similar devices. For example, the short-range communications subsystem may include an infrared device and associated circuits and components, or a Bluetooth™ communication module to provide for communication with similarly-enabled systems and devices.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method, for being performed by a computer system, of publishing an elliptic curve scalar multiplication product of a scalar and a base point on an elliptic curve in a manner that counters power analysis attacks, said base point having a prime order, said method comprising:

receiving said base point and said scalar;

generating a random integer, wherein said random integer is invertible modulo said order of said base point;

obtaining a first factor by multiplying said random integer by said base point;

obtaining a second factor by dividing said scalar by said random integer using modular division, wherein a modulus used for said modular division is said order of said base point, said modular division involving a Montgomery Inversion and a Montgomery Multiplication, said Montgomery Inversion involving an Almost Montgomery Inversion, said Almost Montgomery Inversion having a main loop structure having a plurality of branches, each branch of said plurality of branches including:

a first swap operation, wherein an address, to which a first variable of said plurality of variables refers, is exchanged with an address to which a second variable of said plurality of variables refers;

a second swap operation, wherein an address, to which a third variable of said plurality of variables refers, is exchanged with an addresses to which a fourth variable of said plurality of variables, refers;

a first shift operation, wherein bits in a variable of said plurality of variables are shifted right; and a second shift operation, wherein bits in a variable of said plurality of variables are shifted left;

obtaining a product by multiplying said first factor by said second factor using Montgomery Multiplication; and publishing said product;

wherein the above steps are performed by a micro-processor.

2. The method of claim 1 wherein said third variable comprises said first variable and said fourth variable comprises said second variable for a branch among said plurality of branches.

3. The method of claim 1 wherein a given branch among said plurality of branches is associated with a first answer to a first conditional determination and at least one further conditional determination is associated with a second answer to said first conditional determination, wherein said second answer is an alternative to said first answer and said given branch includes as many additional conditional determinations identical to said first conditional determination as there are possible conditional determinations associated with said second answer.

4. The method of claim 1 wherein said scalar comprises a private cryptographic key.

5. The method of claim 4 wherein said product comprises a public cryptographic key.

6. A mobile communication device for publishing an elliptic curve scalar multiplication product of a scalar and a base point on an elliptic curve in a manner that counters power analysis attacks, said base point having a prime order, said mobile communication device comprising:

a micro-processor adapted to:

receive said base point and said scalar;

generate a random integer, wherein said random integer is invertible modulo said order of said base point;

obtain a first factor by multiplying said random integer by said base point;

obtain a second factor by dividing said scalar by said random integer using modular division, wherein a modulus used for said modular division is said order of said base point, said modular division involving a Montgomery Inversion and a Montgomery Multiplication, said Montgomery Inversion involving an Almost Montgomery Inversion, said Almost Montgomery Inversion having a main loop structure having a plurality of branches, each branch of said plurality of branches including:

a first swap operation, wherein an address, to which a first variable of said plurality of variables refers, is exchanged with an address to which a second variable of said plurality of variables refers;

a second swap operation, wherein an address, to which a third variable of said plurality of variables refers, is exchanged with an addresses to which a fourth variable of said plurality of variables, refers;

a first shift operation, wherein bits in a variable of said plurality of variables are shifted right; and a second shift operation, wherein bits in a variable of said plurality of variables are shifted left;

obtain a product by multiplying said first factor by said second factor using Montgomery Multiplication; and publish said product.

7. The mobile communication device of claim 6 wherein said third variable comprises said first variable and said fourth variable comprises said second variable for a branch among said plurality of branches.

8. The mobile communication device of claim 6 wherein a given branch among said plurality of branches is associated with a first answer to a first conditional determination and at least one further conditional determination is associated with a second answer to said first conditional determination, wherein said second answer is an alternative to said first answer and said given branch includes as many additional conditional determinations identical to said first conditional determination as there are possible conditional determinations associated with said second answer.

9. The mobile communication device of claim 6 wherein said scalar comprises a private cryptographic key.

10. The mobile communication device of claim 9 wherein said product comprises a public cryptographic key.

11. A non-transitory computer readable medium containing computer-executable instructions that, when executed on a processor in a mobile communication device, provide for publishing a product of an elliptic curve scalar multiplication product of a scalar and a base point on an elliptic curve in a manner that counters power analysis attacks, said base point having a prime order, cause said processor to:
   receive said base point and said scalar;
   generate a random integer, wherein said random integer is invertible modulo said order of said base point;
   obtain a first factor by multiplying said random integer by said base point;
   obtain a second factor by dividing said scalar by said random integer using modular division, wherein a modulus used for said modular division is said order of said base point, said modular division involving a Montgomery Inversion and a Montgomery Multiplication, said Montgomery Inversion involving an Almost Montgomery Inversion, said Almost Montgomery Inversion having a main loop structure having a plurality of branches, each branch of said plurality of branches including:
      a first swap operation, wherein an address, to which a first variable of said plurality of variables refers, is exchanged with an address to which a second variable of said plurality of variables refers;
      a second swap operation, wherein an address, to which a third variable of said plurality of variables refers, is exchanged with an addresses to which a fourth variable of said plurality of variables, refers;
      a first shift operation, wherein bits in a variable of said plurality of variables are shifted right; and
      a second shift operation, wherein bits in a variable of said plurality of variables are shifted left;
   obtain a product by multiplying said first factor by said second factor using Montgomery Multiplication; and
   publish said product.

12. The non-transitory computer readable medium of claim 11 wherein said third variable comprises said first variable and said fourth variable comprises said second variable for a branch among said plurality of branches.

13. The non-transitory computer readable medium of claim 11 wherein a given branch among said plurality of branches is associated with a first answer to a first conditional determination and at least one further conditional determination is associated with a second answer to said first conditional determination, wherein said second answer is an alternative to said first answer and said given branch includes as many additional conditional determinations identical to said first conditional determination as there are possible conditional determinations associated with said second answer.

14. The non-transitory computer readable medium of claim 11 wherein said scalar comprises a private cryptographic key.

15. The non-transitory computer readable medium of claim 14 wherein said product comprises a public cryptographic key.

16. A method, for being performed by a computer system, of countering power analysis attacks, said method comprising:
   receiving a base point on an elliptic curve and a scalar, said base point having a prime order;
   generating a random integer, wherein said random integer is invertible modulo said order of said base point;
   obtaining a first factor by multiplying said random integer by said base point;
   obtaining a second factor by dividing said scalar by said random integer using modular division, wherein a modulus used for said modular division is said order of said base point, said modular division involving a Montgomery Inversion and a Montgomery Multiplication, said Montgomery Inversion involving an Almost Montgomery Inversion, said Almost Montgomery Inversion having a main loop structure having a plurality of branches, each branch of said plurality of branches including:
      a first swap operation, wherein an address, to which a first variable of said plurality of variables refers, is exchanged with an address to which a second variable of said plurality of variables refers;
      a second swap operation, wherein an address, to which a third variable of said plurality of variables refers, is exchanged with an addresses to which a fourth variable of said plurality of variables, refers;
      a first shift operation, wherein bits in a variable of said plurality of variables are shifted right; and
      a second shift operation, wherein bits in a variable of said plurality of variables are shifted left;
   obtaining a product by multiplying said first factor by said second factor using Montgomery Multiplication; and
   publish said product;
   wherein the above steps are performed by a micro-processor.

* * * * *